United States Patent [19]

Ohkubo et al.

[11] Patent Number: 5,034,606

[45] Date of Patent: Jul. 23, 1991

[54] METHOD AND APPARATUS FOR CALIBRATING LINE SPECTRUM IRRADIANCE

[75] Inventors: Kazuaki Ohkubo, Takatsuki; Yoshihiro Ohno, Ibaraki, both of Japan

[73] Assignee: Matsushita Electric Industrial Co., Ltd., Osaka, Japan

[21] Appl. No.: 482,894

[22] Filed: Feb. 22, 1990

[51] Int. Cl.$^5$ .............................. G01J 1/00; G01J 1/10; G01J 1/28
[52] U.S. Cl. .................................. 250/372; 250/252.1
[58] Field of Search ..................... 250/372, 252.1 R; 356/218, 243

[56] References Cited

U.S. PATENT DOCUMENTS

| | | | |
|---|---|---|---|
| 3,418,473 | 12/1968 | Blue | 250/372 X |
| 3,851,970 | 12/1974 | Adler et al. | 250/372 X |
| 3,922,095 | 11/1975 | Lee | 356/256 X |
| 4,629,896 | 12/1986 | Bridgen | 250/372 |
| 4,927,266 | 5/1990 | Sugiura et al. | 356/243 |

OTHER PUBLICATIONS

Illuminating Engineering Institute of Japan 71-10 (1987) 646.

*Primary Examiner*—Constantine Hannaher
*Assistant Examiner*—Edward J. Glick
*Attorney, Agent, or Firm*—Stevens, Davis, Miller & Mosher

[57] ABSTRACT

A method and apparatus for measuring a single-wavelength irradiance employ (1) a reference photosensor unit combining a photodiode having an absolute response at a given wavelength calibrated by a self-calibration process and a precision aperture, (2) a single radiation source of the given wavelength combining a band-pass filter having a pass band only near the given wavelength and a radiation source for producing a line spectrum radiation of the given wavelength, and (3) a radiation illuminometer. The reference photosensor unit is arranged at a distance d from the single radiation source to measure the irradiance thereat, and then the radiation illuminometer is arranged at the position of the reference photosensor unit to calibrate an indicating scale of the radiation illuminometer with respect to the single radiation of the given wavelength in relation with the reference photosensor unit.

3 Claims, 2 Drawing Sheets

METHOD AND APPARATUS FOR CALIBRATING LINE SPECTRUM IRRADIANCE

BACKGROUND OF THE INVENTION

Presently, radiation in a band of wavelengths below 300 nm, such as, the bright line or line spectrum of wavelength 253.7 nm, produced for example from a mercury discharge lamp, have come to be used widely in the field of sterilization as well as in the fields of semiconductor manufacture, printing, etc., due to their high photon energies, and the development of radiation sources corresponding to such applications (e.g., the mercury lamp and Excimer laser) has been carried out extensively. As a result, there has been a demand for such techniques designed to accurately measure the energy quantities of single-wavelength radiation in the ultraviolet region, such as, the mercury line spectrum of wavelength 253.7 nm. In addition, there has existed a demand for techniques designed to accurately measure radiation in the wavelength band of below 300 nm, particularly the radiant quantities of wavelengths such as 253.7 nm of the discharge lamp and 184.9 nm of the mercury line spectrum as well as 248 nm of the KrF Excimer laser.

In the past, there has been no Japanese national standard as regards the absolute quantity of the radiation of wavelength 253.7 nm and the measurement of this kind has been effected in the form of measurements by a method in which a filter is combined with a thermal-type detector (usually a thermopile) whose absolute response is calibrated or determined according to the backbody radiation or a luminous intensity standard lamp or spectral irradiance standard lamp calibrated according to the blackbody radiation (Nakagawa et al: "Calibration System of 253.7 nm Irradiance (bactericidal irradiance)", The Illuminating Engineering Institute of Japan, 71-10 (1987) 646).

Then, the thermal-type detector has a low response and also its output variation due to any ambient disturbance is large with resulting deterioration in measuring accuracy. Also, the calibration of the absolute quantity of radiation is effected such that basically the blackbody radiation according to the international temperature scale is used as a primary standard and the value of a total irradiance standard lamp or illuminous intensity standard lamp as a secondary standard is derived from the primary standard thus measuring the absolute quantity of radiation of wavelength 253.7 nm, for example, by using the secondary standard by a method combining a thermal-type detector (e.g., a thermopile) and a filter. Thus, the method is not satisfactory as a practical absolute measurement method in consideration of the accumulation of measuring errors due to the tracing of the value from the primary standard.

SUMMARY OF THE INVENTION

It is an object of the present invention to provide an irradiance measuring method and apparatus so designed that a photodiode which is high in response, stable and has excellent input/output linearity utilizes a self-calibrating process of (1) measuring the surface reflectance of its photosensitive surface and its internal quantum efficiency and (2) determining an absolute response so as to calibrate the absolute response to radiation of wavelength 300 nm, or below, particularly 253.7 nm whereby a photosensor unit combining the photodiode and a precision aperture calibrates the absolute irradiance at a distance d from a 253.7 nm radiation source combining a mercury line spectrum light source and a band-pass filter having a pass band only near wavelength 253.7 nm. The silicon photodiode, band-pass filler having a pass band only wavelength 253.7 nm and the precision aperture are combined, to accurately measure the radiant quantity of the single-wavelength radiation in the band of wavelengths below 300 nm.

In accordance with the above-described means, the photodiode which is high in response, stable and excellent in input/output linearity is provided with an absolute response to a radiation of single wavelength in a band of wavelengths below 300 nm, e.g., 253.7 nm which has been calibrated or determined by a self-calibration process as discussed above. As a result, there is no need to use as a standard a radiation source (such as an electric lamp) which finds it difficult to maintain the desired stability and reproducibility and also the accumulation of measuring errors due to the tracing of the value from the standard is reduced, thereby determining the absolute value of the irradiance with a satisfactorily high degree of accuracy. Also, the photodiode which is high in response, stable and excellent in input/output linearity as compared with the thermal-type detector is constructed as a radiation illuminometer for measuring single-wavelength radiation in a band of wavelengths below 300 nm, e.g., a bactericidal radiation illuminometer, and this makes possible the measurement of an extremely stable irradiance from the practical point of view.

DESCRIPTION OF THE PREFERRED EMBODIMENTS

An embodiment of the present invention will now be described with reference to the drawings by way of a method in which the absolute response of a silicon photodiode to a radiation of wavelength 253.7 nm (mercury line spectrum radiation) is determined by its self-calibration process to calibrate an irradiance measuring photosensor unit for the radiation of wavelength 253.7 nm with reference to the drawings.

With the p-n junction silicon photodiode, the loss at the boundary surface between the $SiO_2$ and Si surfaces and the losses due to the recombination in the p region and the recombination in the n region can be mainly conceived as factors which deteriorate the quantum efficiencies $E_o$, $E_a$ and $E_r$ become 1. By measuring these quantum efficiencies, it is possible to self-calibrate the absolute response of the silicon photodiode (the quantum efficiency $E_a$ is not considered here, since it is extremely close to 1 and there is no appropriate measuring method). The internal quantum efficiency $E(\lambda)$ of the silicon photodiode at a certain wavelength $\lambda$ is given as follows:

$$E(\lambda) = Eo(\lambda)Er(\lambda)/\{1-[1-Eo(\lambda)][1-Er(\lambda)]\}$$

An absolute response $R(\lambda)$ to a radiation at the wavelength $\lambda$ is given as follows:

$$R(\lambda) = [1-\rho(\lambda)]E(\lambda)\lambda/K$$

where $K = e/h \cdot c = 1.23985 [\mu m \cdot W/A]$
$\rho(\lambda)$: reflectance of Si surface at wavelength $\lambda$.

It is to be noted that where the absolute response of the silicon photodiode is determined by the self-calibration process, it is impossible to ensure a satisfactory accuracy in the ultraviolet region of wavelengths below 400 nm. This is due to the fact that when photons of a short wavelength or high energy are incident to the silicon photodiode, in addition to the usual generation of an electron-hole per photon, the kinetic energy of the photons themselves gives rise to an impact ionization effect causing the additional production of a plurality of electron-hole pairs and thus the internal quantum efficiency no longer conforms with the previously mentioned theory. Therefore, the mirror reflection component of the $\rho(\lambda)$ Si surface is determined by measurement with an He-Ne laser of wavelength 632.8 nm so that the value of $Eo(\lambda)$ is determined by the water electrode process and the value of $Er(\lambda)$ is determined by the reverse bias process.

Then, the relative spectral response of the silicon photodiode is measured at wavelengths of 632.8 nm and 253.7 nm, respectively. At this time, a thermal-type detector of the type having no wavelength dependency is used as a spectral response standard. This measurement produces the absolute response of the silicon photodiode at wavelength 253.7 nm.

Figure 1:
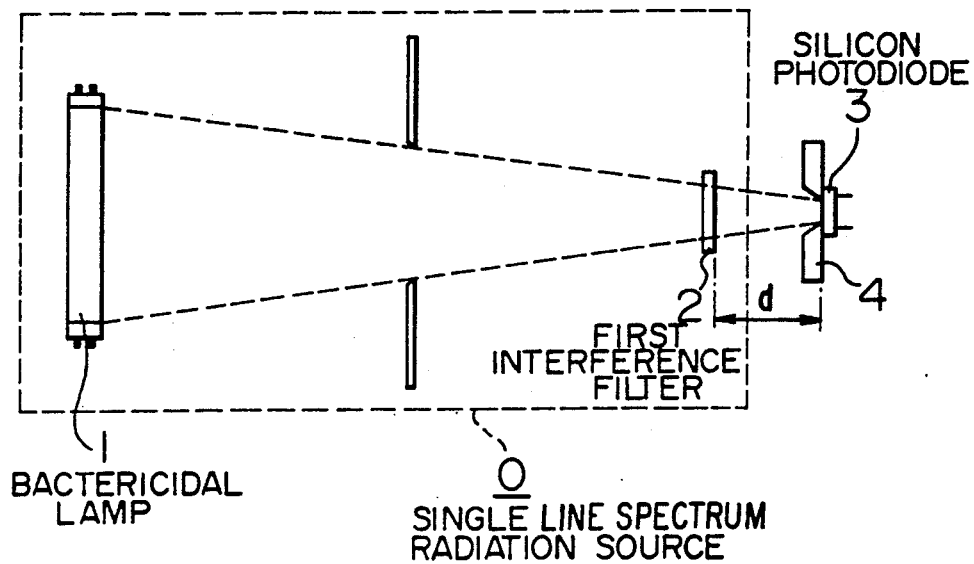
FIG. 1 is a perspective view showing the construction of an optical system for detector-based-calibration of a single-line spectrum radiation source of wavelength 253.7 nm in an embodiment of the present invention.

FIG. 1 shows an optical system for inverse calibration of a single line spectrum radiation source 0 of wavelength 253.7 nm. In the Figure, a bactericidal lamp 1 is combined with a first interference filter 2 having a pass band only near wavelength 253.7 nm, thus forming the single line spectrum radiation source 0 of wavelength 253.7 nm, and the irradiance at a distance d from the single line spectrum radiation source 0 is calibrated or determined by a silicon photodiode 3 whose absolute response has been determined by the self-calibration process and a precision aperture 4 of a known area.

Figure 2:
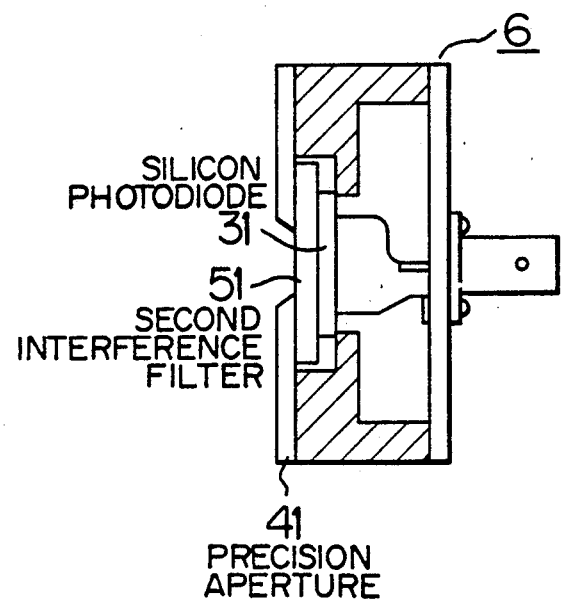
FIG. 2 is a schematic diagram showing the construction of a bactericidal radiation (single bright-line of wavelength of 253.7 nm) illuminometer.

FIG. 2 shows the construction of a bactericidal radiation(single line spectrum of wavelength 253.7 nm) illuminometer 6. In the Figure, a second interference filter 51 having a pass band only near wavelength 253.7 nm is inserted between the precision aperture 41 and the silicon photodiode 31. The bactericidal radiation illuminometer 6 has its absolute response $(AV^{-1} \cdot m^2)$ calibrated by using the irradiance calibrated at the point of the distance d from the single line spectrum radiation source 0.

In accordance with the present embodiment, the absolute response of the silicon photodiode is directly determined from its physical characteristics without using any standard radiation source based on the blackbody radiation, thus making it possible to measure the bactericidal radiation irradiance with a high degree of accuracy.

Figure 3:
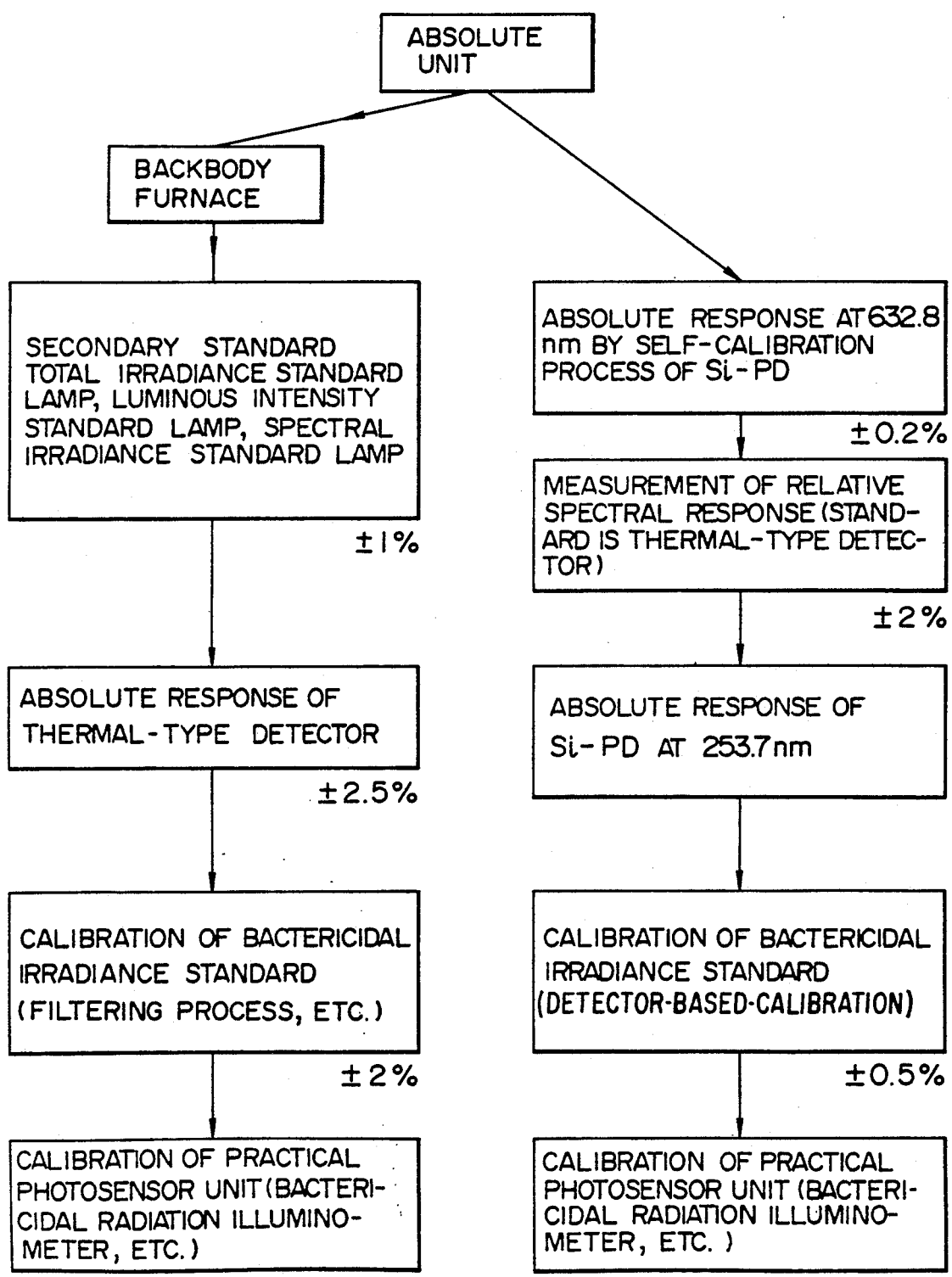
FIG. 3 is a diagram showing a comparison between the embodiment of the present invention and a conventional method.

A comparison in terms of the measuring accuracy between the present embodiment and the irradiance calibrating process of the conventional method employing a combination of a thermal-type detector whose absolute response has been derived from the blackbody radiation based on the international temperature scale will now be described in connection with FIG. 3. The process heretofore used conventionally corresponds to the flowpath on the left side of FIG. 3 and the process is basically so designed that the absolute quantity of radiation is derived from the blackbody radiation (blackbody furnace) for various kinds of secondary standards (total irradiance standard lamp, luminous intensity standard lamp, spectral irradiance standard lamp, etc.) and the absolute response of a thermal-type detector is calibrated against the secondary standard. Errors are caused in the course of this process. Where the 253.7 nm irradiance standard radiation source is calibrated by use of the thermal-type detector, it is necessary to make allowance for an error of the order of about 4% with respect to the absolute unit in the calibration of the practical photosensor unit (bactericidal radiation illuminometer) due to the fact that the detecting capacity of the thermal-type detector is low and that the secondary radiation from for example the valve of the radiation source causes a measuring error due to the sensitivity of the thermal-type detector in the infrared region.

On the contrary, the process of calibrating or determining the absolute irradiance of the 253.7 nm radiation according to the present embodiment is so designed that the absolute response of a silicon photodiode is calibrated by its self-calibration process at a wavelength in the visible region of wavelengths and then the relative spectral response of the silicon photodiode is measured, thereby determining the absolute response at the wavelength 253.7 nm from the results of the two acts. In the present embodiment the self-calibration process of the silicon photodiode is a process which is independent of the international temperature scale and it ensures an accuracy of $\pm 0.2\%$ as compared with the experimental values of the NIST (National Institute of Standards and Technology: former NBS) of America and the Total Electronics Research Laboratory of the Agency of Industrial Science and Technolyogy of Japan. Also, while an error of less than 2% is expected for the measurement of the relative spectral response of the silicon photodiode due to the use of the thermal-type detector as a standard, the silicon photodiode which is stable and also high in response is used as a photosensor unit standard for irradiance and an accuracy of about $\pm 2\%$ with respect to the absolute unit is expected for the calibration of the practical photosensor unit (bactericidal radiation illuminometer).

From the foregoing description it will be seen that in accordance with the construction of the present invention, the photodiode which is high in response, stable and excellent in input/output linearity performs the calibration of its absolute response at for example a wavelength of 253.7 nm by the self-calibration process so that there is no need to use as a standard such radiation source as an electric lamp which finds it difficult to maintain the desired stability and reproducibility and also the accumulation of measuring errors due to the tracing of the value from the standard is reduced, thereby ensuring a satisfactorily high degree of accuracy for the absolute value of an irradiance. Also, since the silicon photodiode which is high in response, stable and excellent in input/output linearity as compared with the thermal-type detector is used to construct a bactericidal radiation illuminometer, it is possible to make an irradiance measurement of the bacterial radiation which is extremely stable from the practical point of view. It is to be noted that in addition to the mercury line spectrum radiation of 253.7 nm, other radiations in a band of wavelengths below 300 nm, particularly the radiant quantity of the mercury bright line of 84.9 nm from a discharge lamp, the radiant quantity of 248 nm from a KrF excimer laser or the like can be accurately measured by this method.

We claim:

1. A method of calibrating line spectrum irradiance comprising the steps of:

forming a reference photosensor unit by combining a photodiode having an absolute response at a given wavelength which has been calibrated by a self-calibration process and a precision aperture;

combining a band-pass filter having a pass band only near said given wavelength and a radiation source for producing a line spectrum radiation at said given wavelength to form a source of radiation of said given wavelength;

arranging said reference photosensor unit detachably at a given distance d from said radiation source to measure an irradiance of said line spectrum radiation at said distance d; and arranging a radiation illuminometer alternately with said reference photosensor unit at said given distance of from said radiation source to calibrate an indicating scale of said radiation illuminometer with respect to said line spectrum radiation of said given wavelength based on said irradiance measured by said reference photosensor unit at said distance d.

2. An irradiance calibration apparatus comprising:

a reference photosensor unit combining a photodiode having an absolute response at a given wavelength which has been calibrated by a self-calibration process and a precision aperture;

a source of radiation of said given wavelength combining a band-pass filter having a pass band only near said given wavelength and a radiation source for producing a line spectrum radiation of said given wavelength, said reference photosensor being detachably arranged at a given distance d from said radiation source to measure an irradiation of said line spectrum radiation at said distance d; and a radiation illuminometer detachably arranged alternately with said reference photosensor at said given distance d from said radiation source, whereby said illuminometer is calibrated with respect to said line spectrum radiation of said given wavelength based on said irradiance measured by said photosensor unit at said distance d.

3. An apparatus according to claim 2, wherein said radiation illuminometer includes an interference filter inserted between said precision aperture and said photodiode, and wherein said interference filter has a pass band only near a wavelength of 253.7 nm.

* * * * *